United States Patent [19]

Takamiya et al.

[11] Patent Number: 5,640,239
[45] Date of Patent: Jun. 17, 1997

[54] OPTICAL DEVICE AND DISPLACEMENT INFORMATION MEASUREMENT APPARATUS USING THE SAME

[75] Inventors: Makoto Takamiya, Tokyo; Hidejiro Kadowaki, Yokohama, both of Japan

[73] Assignee: Canon Kabushiki Kaisha, Tokyo, Japan

[21] Appl. No.: 493,539

[22] Filed: Jun. 22, 1995

[30] Foreign Application Priority Data

Jun. 27, 1994 [JP] Japan .................. 6-144609

[51] Int. Cl.$^6$ ............................................. G01B 9/02
[52] U.S. Cl. ................ 356/345; 356/28.5; 356/351; 356/358; 356/349
[58] Field of Search .................. 356/28.5, 345, 356/351, 354, 356, 349, 358; 359/245, 246, 251, 257, 258, 278

[56] References Cited

U.S. PATENT DOCUMENTS 4,229,073 10/1980 Lofspeich ........................ 359/315
4,343,536 8/1982 Watanabe et al. ............... 359/315

*Primary Examiner*—Frank G. Font
*Assistant Examiner*—Robert Kim
*Attorney, Agent, or Firm*—Fitzpatrick, Cella, Harper & Scinto

[57] ABSTRACT

There is disclosed an optical device having an electrooptic crystal on which a light beam is to be incident, and electrodes for applying a predetermined voltage to the electrooptic crystal.

The electrooptic crystal is disposed in an optical system in which the angles of light rays in the light beam temporally or spatially change, and the electrodes are disposed, so that its voltage application direction is parallel to both the optic axis of the electrooptic crystal and the direction of polarization of the light beam incident on the electrooptic crystal, or is parallel to one of the optic axis and the direction of polarization and is perpendicular to the other.

27 Claims, 10 Drawing Sheets

OPTICAL DEVICE AND DISPLACEMENT INFORMATION MEASUREMENT APPARATUS USING THE SAME

BACKGROUND OF THE INVENTION

1. Field of the Invention

The present invention relates to a displacement information measurement apparatus and an optical device and, more particularly, to a displacement information measurement apparatus for optically measuring the displacement information of a moving object in a non-contact manner and an optical device suitable for the apparatus.

2. Related Background Art

Conventionally, as an apparatus for precisely measuring the displacement information of an object in a non-contact manner, a laser Doppler velocimeter (LDV), a laser encoder, or the like is used. The laser Doppler velocimeter measures the moving velocity of a moving object or fluid by utilizing an effect (Doppler effect) in that when a laser beam is irradiated onto a moving object or fluid, the frequency of the laser beam scattered by the moving object or fluid shifts in proportion to the moving velocity.

FIG. 1 shows an example of the conventional laser Doppler velocimeter. The laser Doppler velocimeter shown in FIG. 1 comprises a laser 1, a collimator lens 2 for obtaining a collimated light beam 3, a beam splitter 4, mirrors 6a, 6b, 6c, and 6d, a focusing lens 8, and a photodetector 9. An object 7 to be measured is moving in the direction of an arrow at a velocity V.

A laser beam emitted by the laser 1 is converted into the collimated light beam 3 by the collimator lens 2, and the beam 3 is split into two light beams 5a and 5b by the beam splitter 4. These light beams 5a and 5b are respectively reflected by the mirrors 6a and 6c, and the mirrors 6b and 6d, and are irradiated onto the object 7 to be measured, which is moving at the velocity V, at an incident angle θ. Light scattered by the object or fluid is detected by the photodetector 9 via the focusing lens 8. The frequencies of the two scattered light beams are subjected to Doppler shifts of +f and −f in proportion to the moving velocity V. Let λ be the wavelength of the laser beam. Then, f can be expressed by equation (1) below:

$$f = V \cdot \sin(\theta)/\lambda \qquad (1)$$

The scattered light beams which have been subjected to the Doppler shifts of +f and −f interfere with each other, and cause a change in density pattern on the light-receiving surface of the photodetector 9. The frequency, F, of the interference light is given by equation (2) below:

$$F = 2f = 2 \cdot V \cdot \sin(\theta)/\lambda \qquad (2)$$

From equation (2), the velocity V of the object 7 to be measured can be obtained by measuring the frequency F (to be referred to as the Doppler frequency hereinafter) of the photodetector 9.

In the above-mentioned conventional laser Doppler velocimeter, as can be seen from equation (2), the Doppler frequency F is inversely proportional to the wavelength λ of the laser beam, and hence, the laser Doppler velocimeter must use a laser light source with a stable wavelength. As a laser light source which is capable of continuous laser oscillation and has a stable wavelength, a gas laser such as an He-Ne laser is popularly used. However, such a gas laser requires a large laser oscillator and a high voltage in a power supply, resulting in a large, expensive apparatus. On the other hand, a laser diode (or a semiconductor laser) used in compact disk drives, video disk drives, optical fiber communications, or the like has temperature dependence although it is very small and can be easily driven.

FIG. 2 shows an example of the typical temperature dependence of a laser diode (quoted from '87 Mitsubishi Semiconductor Data Book; Volume of Optical Semiconductor Elements). A continuous change in wavelength is mainly caused by a change in refractive index of the active layer of the laser diode due to a change in temperature, and is 0.05 to 0.06 nm/°C. On the other hand, a discontinuous change in wavelength is called longitudinal mode hopping, and is 0.2 to 0.3 nm/°C.

In order to stabilize the wavelength, in general, a method of controlling the laser diode at a given temperature is adopted. In this method, temperature control members such as a heater, radiator, temperature sensor, and the like must be attached to the laser diode to have a small heat resistance, and temperature control must be performed precisely. As a result, the laser Doppler velocimeter becomes relatively large in size and its cost increases. In addition, instability due to the above-mentioned longitudinal mode hopping cannot be perfectly removed.

As a laser Doppler velocimeter which can solve the above-mentioned problems, the following system has been proposed. That is, a laser beam as a light source is incident on a diffraction grating, two diffracted light beams of the +nth and −nth orders, other than the 0th order, of the diffracted light obtained from the diffraction grating are irradiated onto a moving object or fluid at the same crossing angle as the angle defined by these two light beams, and scattered light from the moving object or fluid is detected by a photodetector.

FIG. 3 shows an example of diffraction when a laser beam I is incident on a transmission type diffraction grating 10 with a grating pitch d in a direction perpendicular to the alignment direction, t, of grating lines. The diffraction angle, θ0, is given by:

$$\sin\theta 0 = m\lambda/d$$

where m is the order (0, 1, 2, ... ) of diffraction, and λ is the wavelength of light.

Of these light beams, ±nth-order light beams other than the 0th-order light are expressed by:

$$\sin\theta 0 = \pm n\lambda/d \qquad (3)$$

for n =1, 2, ...

FIG. 4 shows a case wherein the two light beam, i.e., the ±nth-order light beams are irradiated onto the object 7 to be measured via the parallel mirrors 6a and 6b to have an incident angle θ0. From equations (2) and (3), the Doppler frequency F of the photodetector 9 is given by:

$$F = 2V \sin\theta 0/\lambda = 2nV/d \qquad (4)$$

The frequency F does not depend on the wavelength λ of the laser beam I, is inversely proportional to the grating pitch d of a diffraction grating 20, and is proportional to the velocity of the object 7 to be measured. Since the grating pitch d can be sufficiently stabilized, the Doppler frequency F is proportional to only the velocity of the object 7 to be measured. The same applies to a case wherein the diffraction grating 20 comprises a reflection type diffraction grating.

In general, when highly coherent light such as a laser beam is irradiated onto an object, scattered light is randomly phase-modulated by a minute surface structure on the object, and forms a dot pattern, a so-called speckle pattern, on the observation surface. In the laser Doppler velocimeter, when an object or fluid moves, a change in density pattern due to the Doppler shift on the detection surface of the photodetector is modulated by an irregular change in density pattern due to the flow of the speckle pattern, and the output signal from the photodetector is also modulated by a change in transmittance (or reflectance) of an object to be measured.

In the above-mentioned LDV, since the frequency of change in density pattern due to the flow of the speckle pattern and the frequency of change in transmittance (or reflectance) of the object to be measured are lower than the Doppler frequency given by equation (2), the output from the photodiode is supplied to a high-pass filter to remove the low-frequency components, thereby extracting only a Doppler signal. However, if the velocity of the object to be measured is low and therefor the Doppler frequency is low, the frequency difference from the low-frequency variation components becomes small, and a high-pass filter cannot be used. As a result, the measurement of the velocity of the object to be measured may be disabled. In addition, the velocity direction cannot be detected in principle.

As a technique for attaining a measurement including that of the velocity direction from a still state, a method (frequency shifter) of setting a frequency difference between two light beams before the two light beams are irradiated onto an object to be measured is known.

In general, an acoustooptic element is used as the frequency shifter. In this case, since the incident angle of light beams on the acoustooptic element must be set to the Bragg diffraction angle, the acoustooptic element cannot be inserted in an optical system in which the optical path changes depending on the wavelength, as shown in FIG. 4.

FIG. 5 shows an example of a laser Doppler velocimeter which uses a frequency shifter consisting of an electrooptic crystal in place of the acoustooptic element.

In the electrooptic crystal, the refractive index of the medium changes depending on the electric field to be applied. For example, trigonal systems 3m such as $LiNbO_3$, $LiTaO_3$, and the like, and tetragonal systems 42m such as $(NH_4)H_2PO_4(ADP)$, $KH_2PO_4(KDP)$, and the like are known. The following explanation will be given taking $LiNbO_3$ as an example.

The index ellipsoid of $LiNbO_3$ (3m) is given by:

$$(1/N_o^2-\gamma_{22}E_2+\gamma_{13}E_3)X^2+(1/N_o^2+\gamma_{22}E_2+\gamma_{13}E_3)Y^2+(1/N_e^2+\gamma_{33}E_3)Z^2-2\gamma_{22}E_1XY+2\gamma_{51}E_2YZ+2\gamma_{51}E_1ZX=1 \quad (5)$$

where $\gamma$ (with a suffix) is a Pockels constant, and $N_o$ and $N_e$ are respectively the refractive indices of ordinary and extraordinary rays.

This apparatus adopts an arrangement for applying a voltage to this electrooptic crystal. If the rate of change in voltage V per unit time is set to be constant, light transmitted through $LiNbO_3$ has a constant rate of change in phase amount per unit time. In other words, the crystal serves as a frequency shifter. However, when the voltage is changed at a constant rate, the voltage increases infinitely. For this reason, in practice, a sawtooth wave (serrodyne) driving operation is performed, as shown in FIG. 6. The driving operation is performed by a value with which the voltage amplitude corresponds to an optical phase of $2\pi$, so that the optical phase does not become discontinuous in a return portion. If the serrodyne frequency is represented by fR, the light beam I is frequency-shifted by fR.

The apparatus shown in FIG. 5 utilizes the above-mentioned principle, and has been described by Foord et al., (Appl. Phys., Vol. 7, 1974, L36–L39). A laser beam is split into two light beams by the beam splitter 4, and these light beams are transmitted through an electrooptic crystal 10. The two light beams which have been frequency-shifted by the serrodyne driving operation are deflected by a lens 15, and cross in a convergent state. This arrangement is normally utilized as a current meter, and attains measurements including that of the velocity direction from a still state. The Doppler frequency is given using the frequency difference fR between the two light beams by the following equation:

$$F=2\cdot V\cdot \sin(\theta)/\lambda+fR \quad (6)$$

Therefore, even when the velocity V of the object 7 to be measured is low, if fR is set to be an appropriate value, a sufficient frequency difference from the low-frequency component caused by the flow of the speckle pattern or the change in transmittance (or reflectance) of the object to be measured can be assured, and only a Doppler signal is extracted by electrically removing the low-frequency components, thus allowing velocity detection.

Conventionally, the laser beam is perpendicularly incident on the electrooptic crystal, as shown in FIG. 5, and, to insert an electrooptic crystal in an optical system, it is a common practice to adopt a structure in which a collimated light beam is perpendicularly incident and the optical path is immovable. In the conventional arrangement, when the incident angle of the light beams varies, then a relationship between the electric field to the electrooptic crystal, and the change in refractive index also changes. As a result, even when the voltage amplitude of the serrodyne driving operation is set to be constant, the change in optical phase deviates from $2\pi$.

However, if the optical path is immovable, as can be seen from equation (6), when the laser wavelength varies, the Doppler signal to be detected varies, thus disturbing high-precision measurement.

SUMMARY OF THE INVENTION

The present invention has been made in consideration of the above-mentioned prior art, and has as its first object to provide a displacement information measurement apparatus, which has a simple arrangement, can perform measurements of an object to be measured even when its velocity is low, and can attain measurements free from the influence of a variation in wavelength of a light beam and also free from the influence of a temporal or spatial variation in an angle of light rays upon variation in wavelength.

It is the second object of the present invention to provide an optical device which can precisely generate an optical phase change using an electrooptic crystal in an optical system in which the angle of light rays of a light beam changes temporally or spatially.

Other objects of the present invention will become apparent from the following description of the embodiments.

DESCRIPTION OF THE PREFERRED EMBODIMENTS

Figure 1:
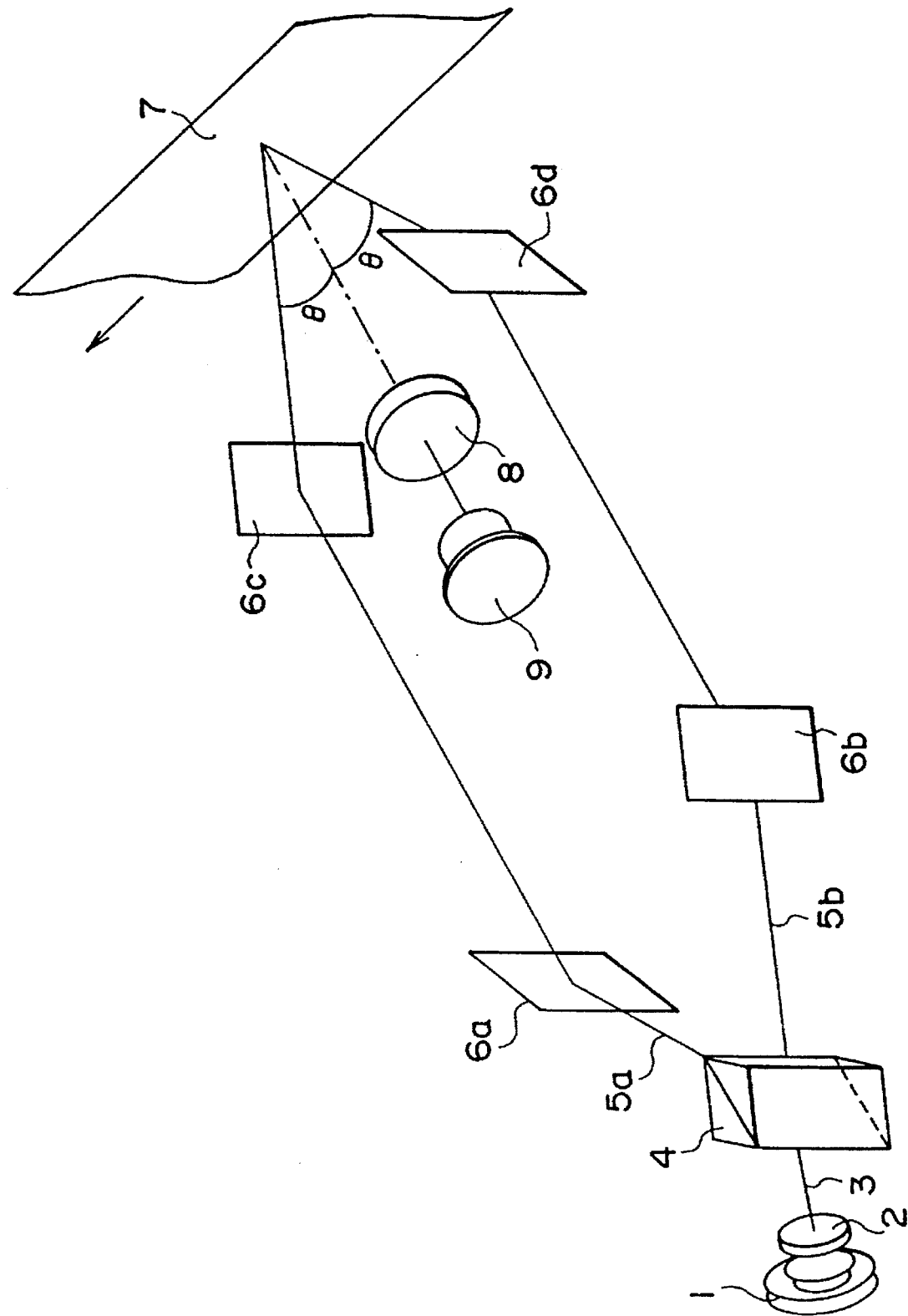
FIG. 1 is a schematic view showing a conventional laser Doppler velocimeter.
Figure 2:
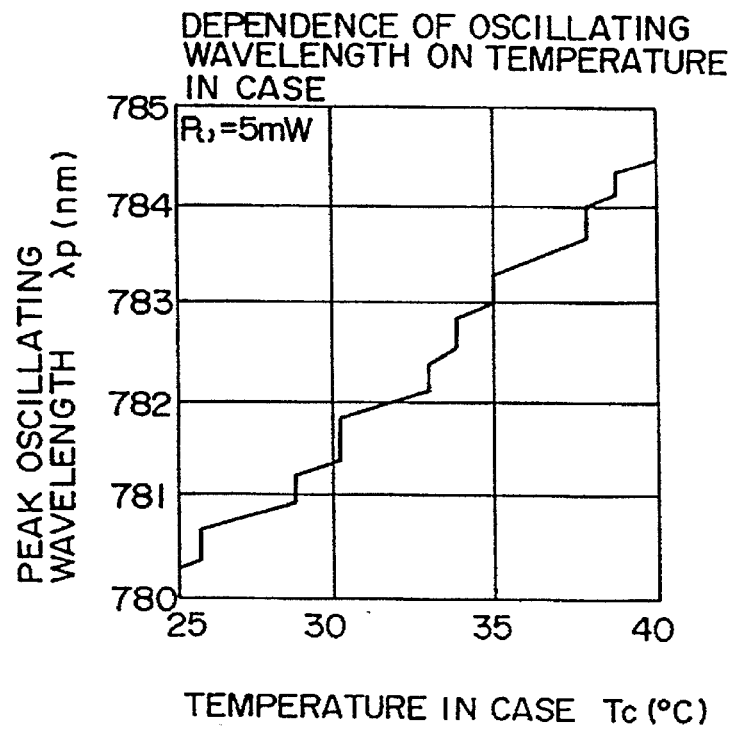
FIG. 2 is a graph showing the dependence of the oscillating frequency of a laser diode on temperature.
Figure 3:
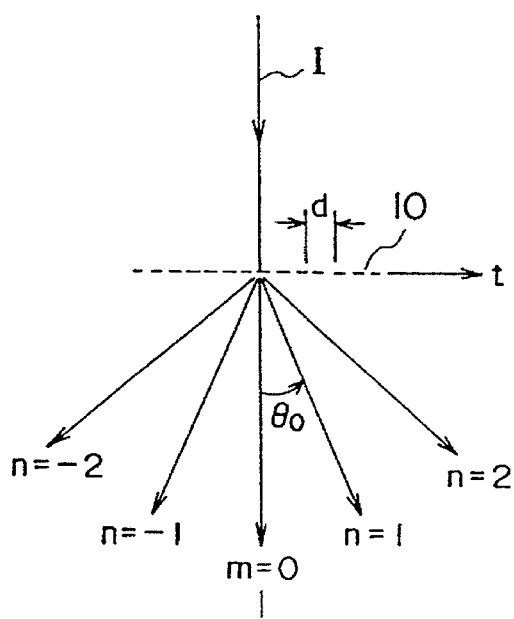
FIG. 3 is an explanatory view of a diffraction grating.
Figure 4:
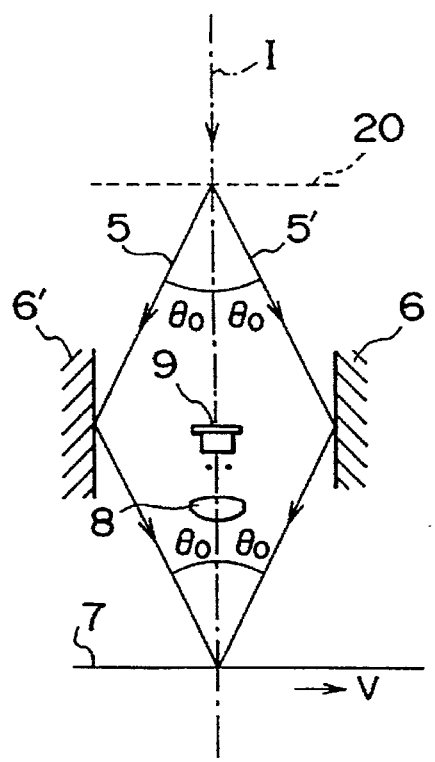
FIG. 4 is an explanatory view of a laser Doppler velocimeter using a diffraction grating.
Figure 5:
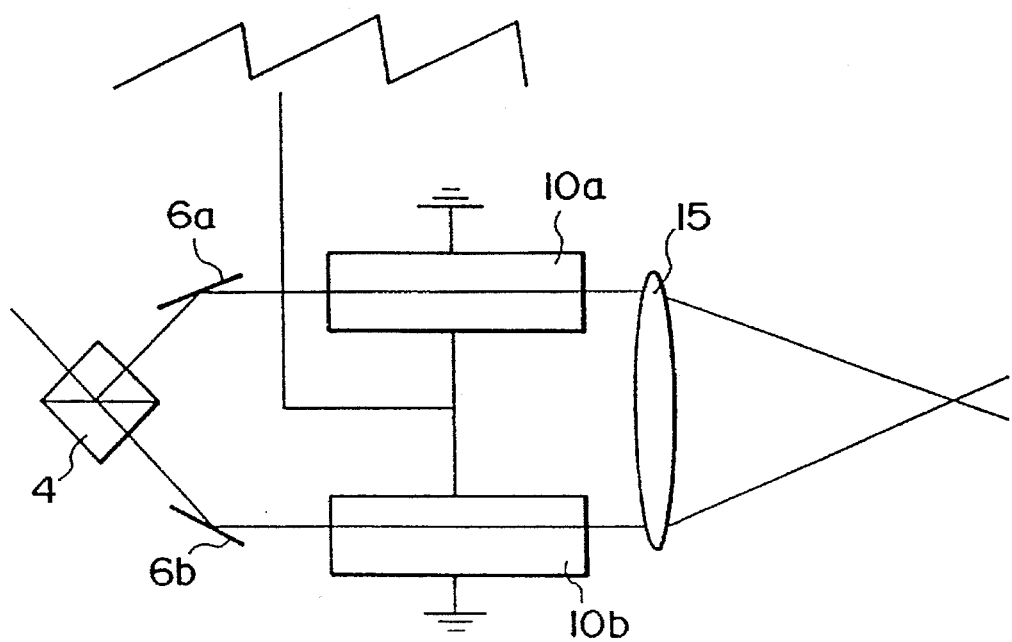
FIG. 5 is a view for explaining the prior art by Foord et al.
Figure 6:
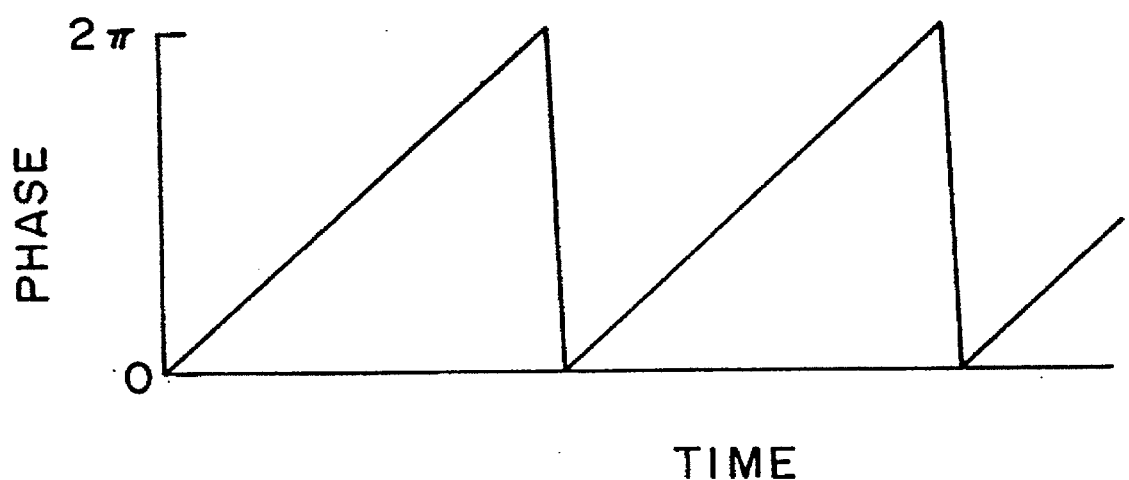
FIG. 6 is a view for explaining sawtooth (serrodyne) driving.
Figure 7:
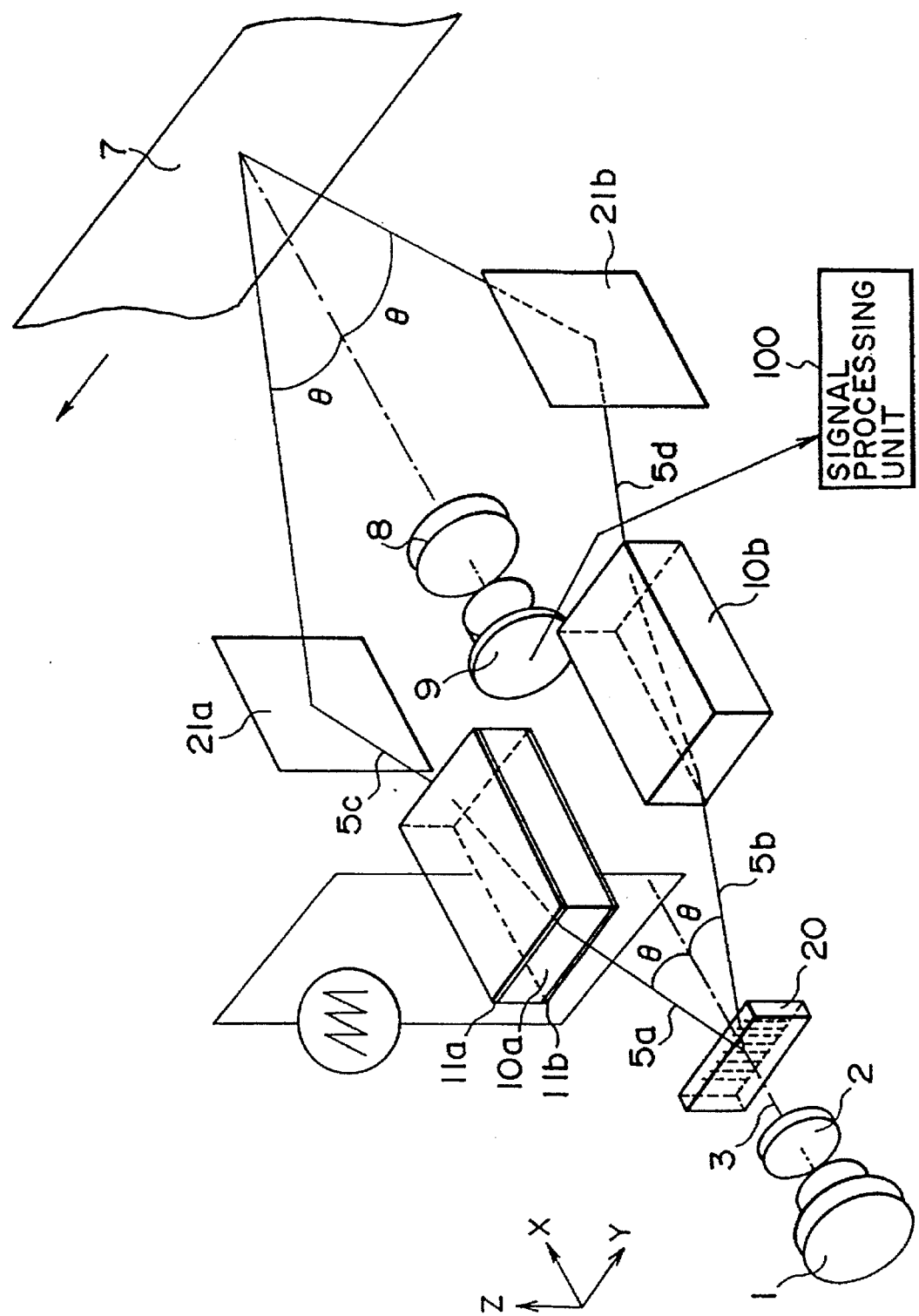
FIG. 7 is a view showing the arrangement according to the first embodiment of the present invention.

FIG. 7 is an explanatory view of the arrangement of a laser Doppler velocimeter according to the first embodiment of the present invention.

A laser beam emitted by a laser diode 1 is set to be linearly polarized light along the Z-axis, and is converted into a collimated light beam 3 by a collimator lens 2. The collimated light beam 3 is split into two light beams 5a and 5b at a diffraction angle $\theta$ by a diffraction grating 20 which has a grating alignment direction parallel to the Y-axis, and a grating pitch d.

At this time, the diffraction angle $\theta$ is given by:

$$d \sin \theta = \lambda \tag{7}$$

The two light beams 5a and 5b are incident at the angle $\theta$ on rectangular parallelopiped electrooptic crystals ($LiNbO_3$ in this embodiment) 10a and 10b having a c-axis (optic axis) parallel to the Z-axis. Electrodes 11a and 11b apply an electric field to only the electrooptic crystal 10a associated with the light beam 5a. If each of the electrooptic crystals 10a and 10b has a thickness d=1 mm and a length l=20 mm, the laser wavelength is set to be $\lambda$=780 nm, and the grating pitch d is set to be d=1.6 μm, the effective length l' of the electrooptic crystals 10a and 10b through which the light beams 5a and 5b are transmitted is given by:

$$l' = l/\cos(\theta') \tag{8}$$

where $\theta'$ is the angle of the light beam inside the electrooptic crystal, and satisfies the following relation:

$$\sin(\theta) = N_e \cdot \sin(\theta') \tag{9}$$

From equation (7), since $\theta \approx 29.18°$, l'=20.54 mm. If the extraordinary ray refractive index $N_e$=2.2 and the Pockels constant $\gamma$=32.2×10$^{-9}$ (mm/V), the phase difference between the two light beams becomes $2\pi$ when the voltage amplitude is V≈224 V. When the serrodyne driving operation is performed with this voltage amplitude and at the frequency fR, two light beams 5c and 5d having a frequency difference fR therebetween are obtained. The two light beams 5c and 5d emerging from the electrooptic crystals 10a and 10b at the same angle as the incident angle are deflected by mirrors 21a and 21b, and are irradiated onto an object 7 to be measured (in the velocity measurement direction thereof), which is moving at a velocity V, at the same incident angle $\theta$ as the diffraction angle. With this arrangement, sin $\theta/\lambda$ becomes almost constant with respect to the incident angle $\theta$. Scattered light from the object is detected by a photodetector 9 via a focusing lens 8.

The Doppler frequency at that time is given using the frequency difference fR between the two light beams as in equation (6) by the following equation:

$$F = 2 \cdot V \cdot \sin(\theta)/\lambda + fR \tag{10}$$

From equation (7), equation (10) is rewritten as equation (11) below, and using this equation, the velocity V is calculated by a signal processing unit 100, including a filter circuit for removing low-frequency components, from the detected frequency F output from the photodetector 9.

$$F = 2 \cdot V/d + fR \tag{11}$$

As can be understood from equation (11), this arrangement allows detection of a signal free from dependence on the wavelength of the laser. More specifically, when the wavelength varies, the diffraction angle changes according to equation (7), but this apparatus can still remove the wavelength dependence of the Doppler signal. Also, the angle of the light beam incident on the electrooptic crystal 10a changes. However, since the direction of polarization of the light beam matches the c-axis (optic axis) of the electrooptic crystal 10a, the direction of polarization is maintained after the light beam is transmitted through the electrooptic crystal 10a. From equation (8), the effective length l' changes due to the change in incident angle, and the voltage amplitude changes. In this case, the change amount is negligible. For this reason, even when the wavelength changes, a signal can be detected with high precision.

In particular, in this apparatus, even when a (temporal) variation in the incident angle of the laser beam (the incident angles of light rays in the light beam are spatially equal to each other, i.e., a collimated light beam) on the electrooptic crystal 10a occurs, the relationship between the change in electric field and the change in refractive index is constant, so that sin $\theta/\lambda$ becomes almost constant. More specifically, the change in optical phase by constant serrodyne driving can be made constant independently of the incident angle of the light beam. This will be explained in detail below. FIGS. 8 to 15 show the relationship among the c-axis of the electrooptic crystal, the electric field direction (the opposing direction of the electrodes 11a and 11b in FIGS. 8 to 15), and the direction of polarization of the incident light rays. If the direction of the c-axis is not perpendicular or parallel to the plane of polarization, it is not preferable since the direction of polarization of the incident/exit light beam undesirably changes. In addition, since the electrooptic crystal ordinary has a rectangular parallelopiped shape defined by sides parallel to and perpendicular to the c-axis, and it is easy to form electrodes on the surface of this rectangular parallelopiped, only these eight dispositions are assumed in practice.

Figure 8:
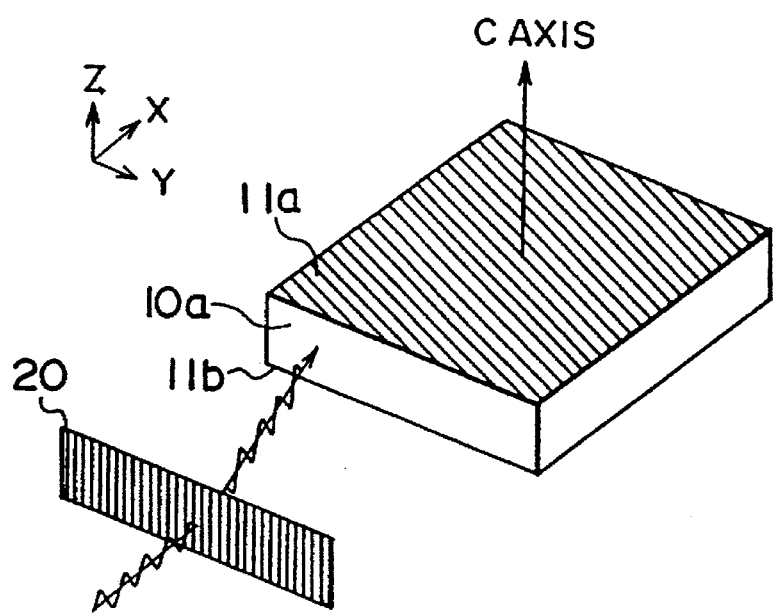
FIG. 8 is a view showing the relationship among the c-axis of an electrooptic crystal, the electric field direction, and the direction of polarization.

FIG. 8 shows the disposition of the above-mentioned embodiment shown in FIG. 7. The c-axis direction (represented by C hereinafter) is parallel to the electric field direction (represented by E hereinafter) (i.e., matches the longitudinal direction of the grating lines of the diffraction grating), and the direction of polarization (represented by P hereinafter) of the incident laser beam is also parallel thereto. That is, C//E//P, and all these directions are parallel to the Z-axis direction in FIG. 8.

In this case, equation (5) above is rewritten as follows:

$$Z^2/N_e^2(1-N_e^2\gamma_{33}E_3/2)^2=1$$

In this case, there are no parameters associated with X and Y. For this reason, even when the wavelength changes, the diffraction angle of the diffraction grating 20 changes, and the incident angle of the laser beam on the electrooptic crystal 10a changes in the X-Y plane, the relationship between the change in refractive index and the change in electric field strength remains the same. In this case, the Pockels coefficient as the change coefficient between the refractive index and the electric field strength is $\gamma_{33}=32.2\times10^{-9}$ (mm/V).

Figure 9:
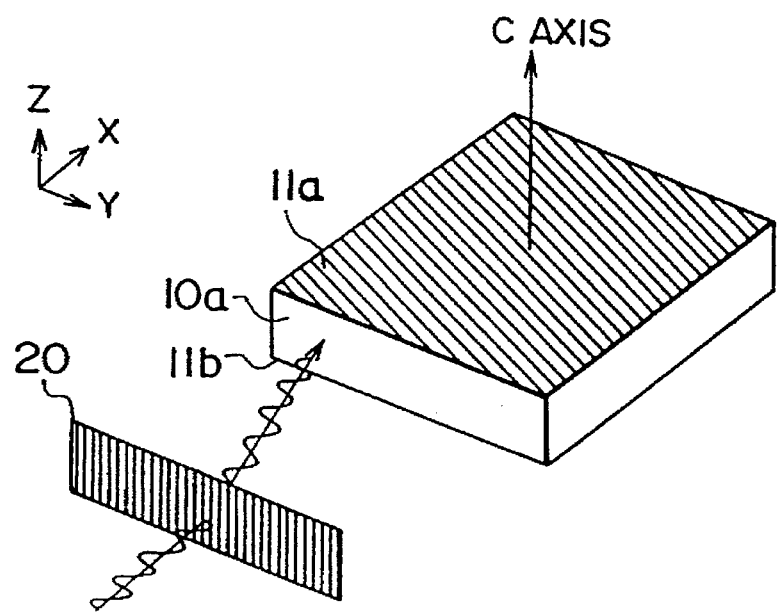
FIG. 9 is a view showing the relationship among the c-axis of an electrooptic crystal, the electric field direction, and the direction of polarization.

The disposition in FIG. 9 is different from FIG. 8 in that the direction of polarization of the laser beam is perpendicular to the Z-axis direction (parallel to the X-Y plane). That is, ((C//E)⊥P). In this case, equation (5) above is:

$$(X^2+Y^2)/N_o^2(1-N_o^2\gamma_{13}E_3/2)^2=1$$

As can be understood from the term $X^2+Y^2$, the refractive index formula defines a circle. For this reason, even when the wavelength changes, the diffraction angle of the diffraction grating 20 changes, and the incident angle of the laser beam on the electrooptic crystal 10a changes in the X-Y plane, the relationship between the change in refractive index and the change in electric field strength remains the same. In this case, the Pockels coefficient as the change coefficient between the refractive index and the electric field strength is $\gamma_{13}=10\times10^{-9}$ (mm/V).

Figure 10:
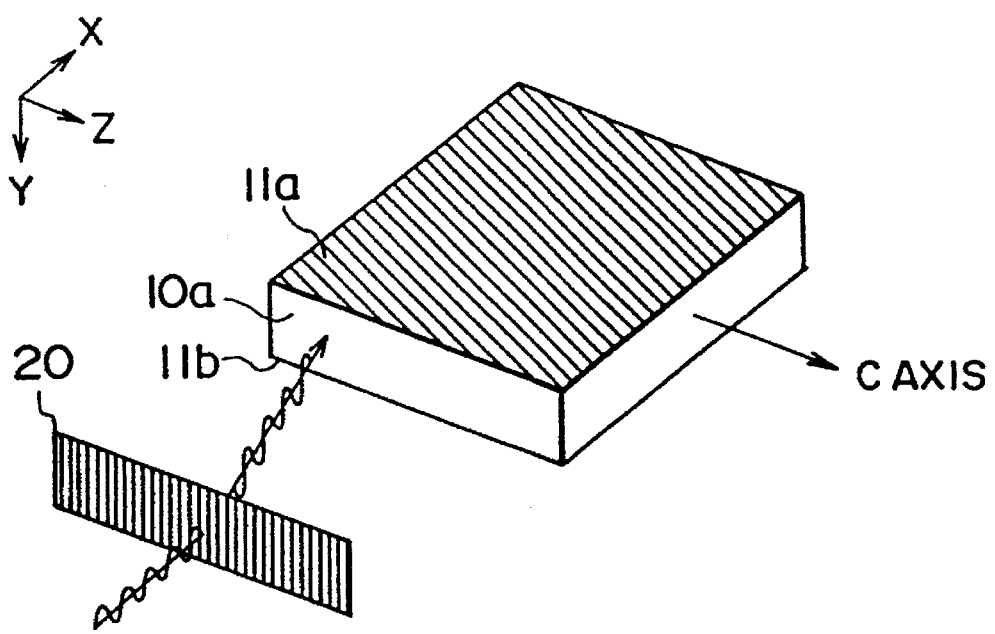
FIG. 10 is a view showing the relationship among the c-axis of an electrooptic crystal, the electric field direction, and the direction of polarization.

The disposition in FIG. 10 is different from FIG. 8 in that the c-axis direction of the electrooptic crystal 10a is perpendicular to the electric field direction and the direction of polarization of the laser beam (parallel to the grating alignment direction of the diffraction grating) (since the c-axis direction normally matches the Z-axis direction, the coordinate disposition is different from FIG. 8). That is, ((E//P)⊥C). In this case, equation (5) above becomes:

$$Y^2/N_o^2(1-N_o^2\gamma_{22}E_2/2)^2=1$$

Thus, even when the wavelength changes, the diffraction angle of the diffraction grating 20 changes, and the incident angle of the laser beam on the electrooptic crystal 10a changes in the X-Z plane, the relationship between the change in refractive index and the change in electric field strength remains the same. In this case, the Pockels coefficient as the change coefficient between the refractive index and the electric field strength is $\gamma_{22}=6.8\times10^{-9}$ (mm/V).

Figure 11:
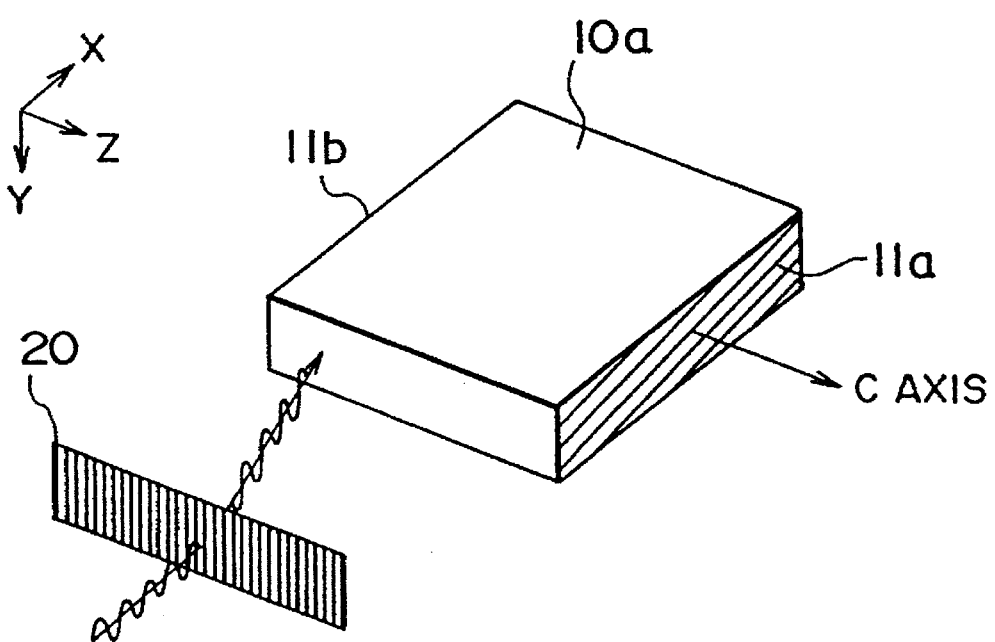
FIG. 11 is a view showing the relationship among the c-axis of an electrooptic crystal, the electric field direction, and the direction of polarization.

The disposition in FIG. 11 is different from the disposition in FIG. 10 in that the electric field direction is parallel to the c-axis direction. That is, ((C//E)⊥P). In this case, equation (5) above takes the form:

$$Y^2/N_o^2(1-N_o\gamma_{13}E_3/2)^2=1$$

Thus, even when the wavelength changes, the diffraction angle of the diffraction grating 20 changes, and the incident angle of the laser beam on the electrooptic crystal 10a changes in the X-Z plane, the relationship between the change in refractive index and the change in electric field strength remains the same. In this case, the Pockels coefficient as the change coefficient between the refractive index and the electric field strength is $\gamma_{13}=10\times10^{-9}$ (mm/V).

In the above-mentioned cases, the relationship between the change in refractive index and the electric field intensity remains the same independently of the variation in incident angle of the laser beam. Therefore, in the present invention, one of the dispositions shown in FIGS. 8 to 11 can be adopted in the arrangement shown in FIG. 7. More specifically, in the apparatus shown in FIG. 7, the c-axis direction, the electric field direction, and the direction of polarization of the laser beam can be replaced by those in any of FIGS. 9 to 11. In particular, since the arrangement shown in FIG. 7 adopts the disposition shown in FIG. 8, and the Pockels coefficient as the change coefficient between the refractive index and the electric field strength is maximized in $LiNbO_3$ used in this case, a change in refractive index can be efficiently generated by a low application voltage.

Figure 12:
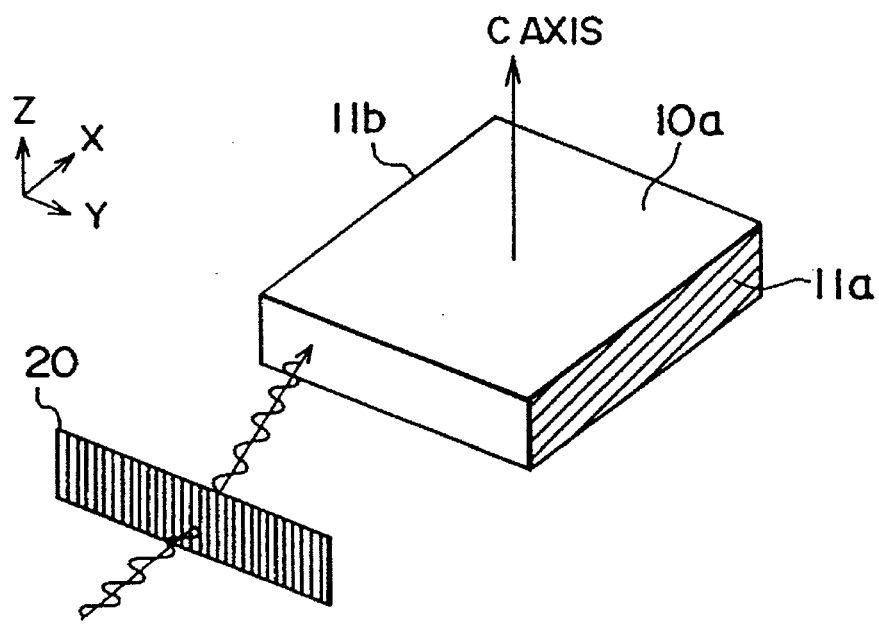
FIG. 12 is a view showing the relationship among the c-axis of an electrooptic crystal, the electric field direction, and the direction of polarization.

In FIG. 12, the c-axis is set to be parallel to the longitudinal direction of the grating lines of the diffraction grating, the electric field direction is perpendicular to the c-axis, and the direction of polarization of the laser beam is also perpendicular to the c-axis. In this case, the direction of polarization of an obliquely incident laser beam is not parallel to the electric field direction. Even when these directions are set to be parallel to each other, the incident direction of the light beam changes if the wavelength changes, and these directions are substantially non-parallel to each other. That is, C⊥K, C⊥P, and E∥P. In this case, equation (5) above reduces to:

$$(1/N_o^2-\gamma_{22}E_2)X^2+(1/N_o^2+\gamma_{22}E_2)Y^2=1$$

Therefore, $\gamma_{22}$ acts in the minus direction along the X-axis, and acts in the plus direction along the Y-axis. As a result, the refractive index changes depending on the incident angle.

Figure 13:
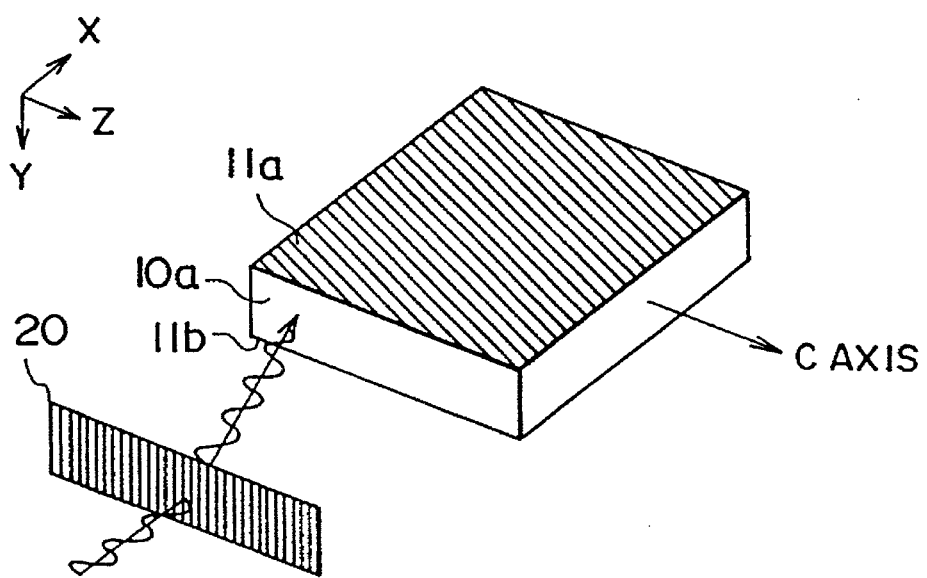
FIG. 13 is a view showing the relationship among the c-axis of an electrooptic crystal, the electric field direction, and the direction of polarization.

In FIG. 13, the c-axis is set to be parallel to the alignment direction of the grating lines of the diffraction grating, the electric field direction is perpendicular to the c-axis, and the direction of polarization of the laser beam is perpendicular to the electric field direction. In this case, the direction of polarization of an obliquely incident laser beam is not parallel to the c-axis direction. Even when these directions are set to be parallel to each other, the incident direction of the light beam changes if the wavelength changes, and these directions are substantially non-parallel to each other. That is, C⊥E⊥P, and C∥P. In this case, equation (5) above is rewritten as:

$$(1/N_o^2-\gamma_{22}E_2)X^2+Z^2/N_e^2=1$$

Therefore, since $N_o$ acts along the X-axis and $N_e$ acts along the Z-axis, the refractive index changes depending on the incident angle.

Figure 14:
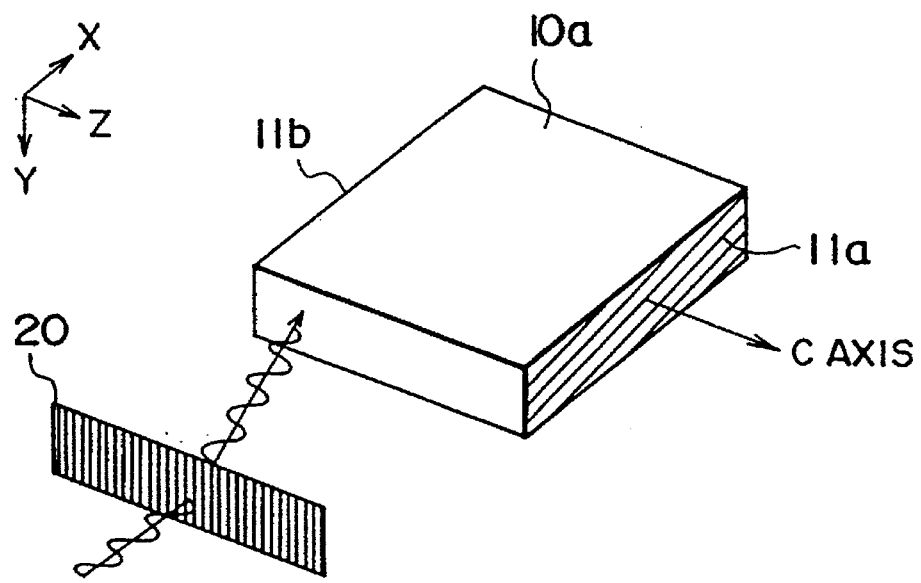
FIG. 14 is a view showing the relationship among the c-axis of an electrooptic crystal, the electric field direction, and the direction of polarization.

In FIG. 14, the c-axis is set to be parallel to the alignment direction of the grating lines of the diffraction grating, the electric field direction is parallel to the c-axis, and the direction of polarization of the laser beam is perpendicular to the c-axis. In this case, the direction of polarization of an obliquely incident laser beam is not parallel to the c-axis and electric field directions. Even when these directions are set to be parallel to each other, the incident direction of the light beam changes if the wavelength changes, and these directions are substantially non-parallel to each other. That is, C//E⊥P. In this case, equation (5) above is:

$$(1/N_o^2 + \gamma_{13}E_3)X^2 + (1/N_e^2 + \gamma_{33}E_3)Z^2 = 1$$

Therefore, since $N_o$ acts along the X-axis and $N_e$ acts along the Z-axis, the refractive index changes depending on the incident angle.

As described above, when the electric field direction or the c-axis is substantially non-parallel to the direction of polarization of the laser beam whose incident angle varies (except for perpendicularity), the relationship between the change in refractive index and the electric field strength changes depending on the variation in incident angle.

Figure 15:
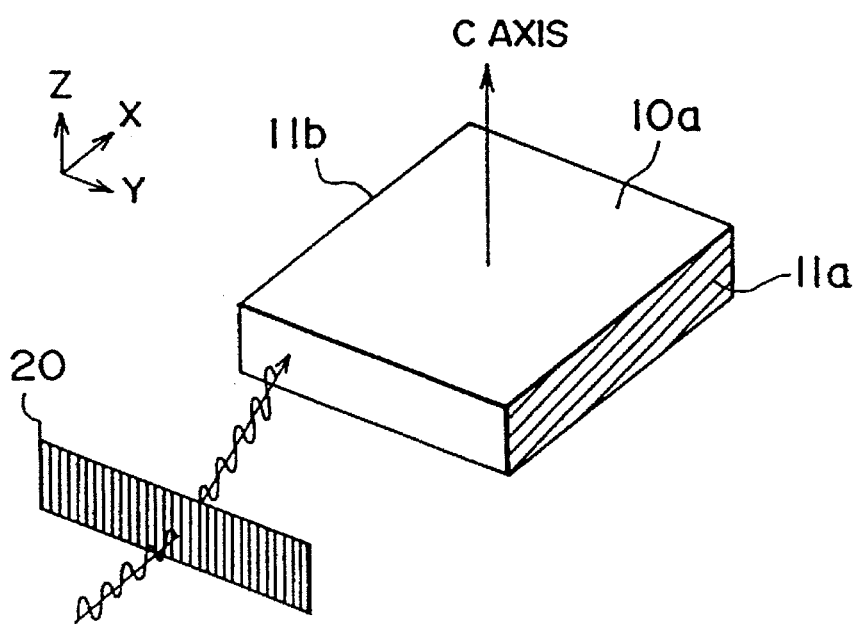
FIG. 15 is a view showing the relationship among the c-axis of an electrooptic crystal, the electric field direction, and the direction of polarization.

On the other hand, the disposition in FIG. 15 is different from FIG. 8 in that the electric field direction is perpendicular to the c-axis and the direction of polarization (the alignment direction of the grating lines of the diffraction grating). That is, C⊥E⊥P//C. In this case, equation (5) above becomes:

$$Z^2/N_e^2 = 1$$

Therefore, the refractive index becomes constant independently of the application voltage, and the function of the frequency shifter is lost.

As can be understood from the above description, only when all C, E, and P are parallel to each other, or when one of C and P is parallel to E and the remaining one is perpendicular to E, a constant relationship between the change in refractive index and the electric field strength can be obtained independently of the variation in incident angle, and the change in optical phase by constant serrodyne driving can be made constant independently of the incident angle of the light beam.

In the above-mentioned embodiment shown in FIG. 7, since the electrooptic crystals 10a and 10b are respectively arranged in the optical paths of the two light beams, they can be inserted without changing any optical positional relationship such as the optical path lengths of the two light beams.

In the above embodiment, the electrooptic crystal for one light beam is voltage-driven. Alternatively, the electrooptic crystals for the two light beams may be driven by counter voltages to reduce the voltage values. Moreover, different electrooptic crystals are used for the two light beams. However, only one electrooptic crystal may be used, as a matter of course.

Figure 16:
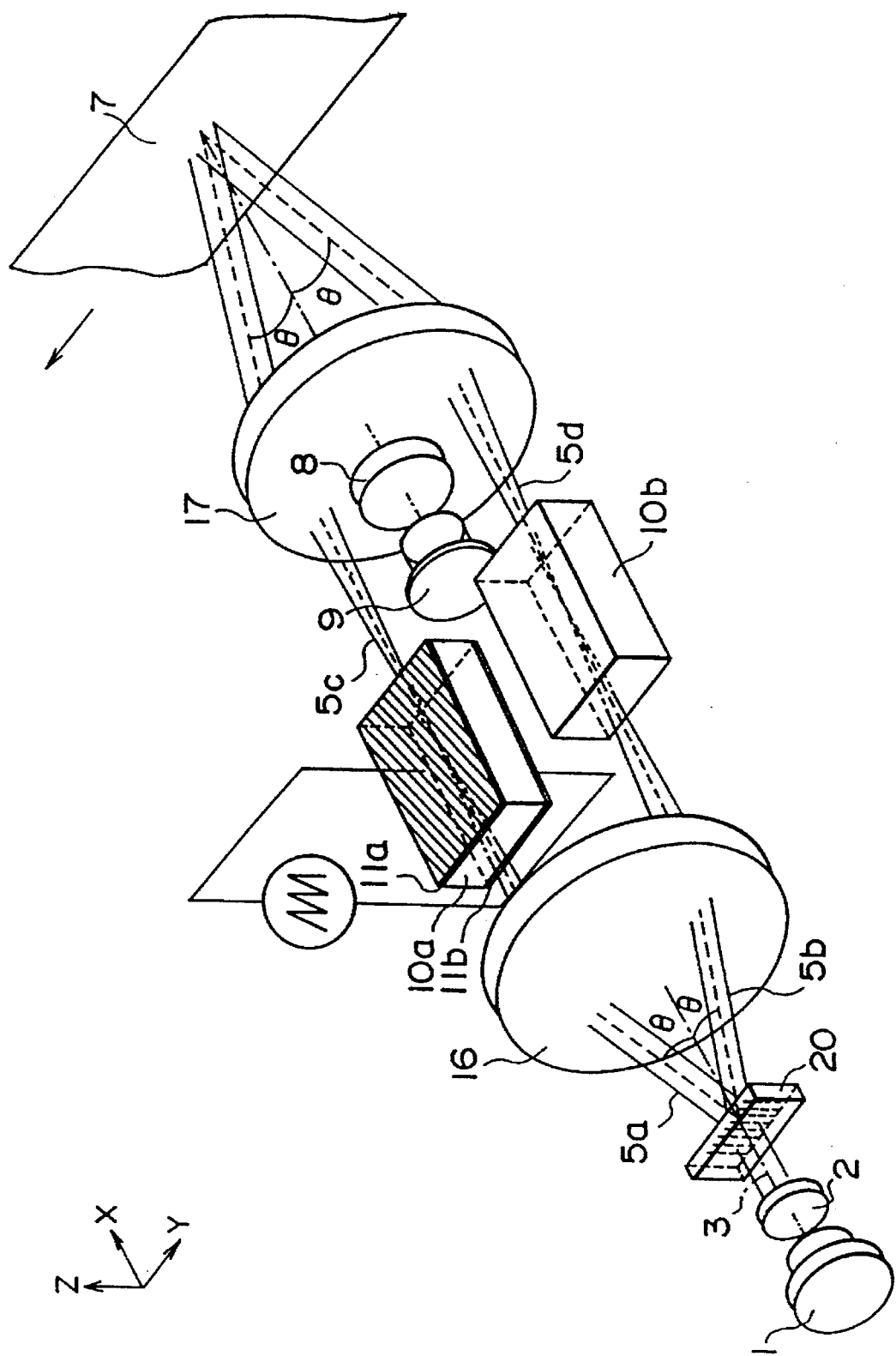
FIG. 16 is a view showing the arrangement according to the second embodiment of the present invention.

FIG. 16 shows the second embodiment of the present invention. In this embodiment, the arrangement in which $\sin\theta/\lambda$ becomes almost constant with respect to the incident angle $\theta$ in an optical system constituted by lenses 16 and 17 in place of the mirrors 21a and 21b in the first embodiment is attained. The same reference numerals in this embodiment denote the same parts as in the first embodiment, and a detailed description thereof will be omitted.

The lenses 16 and 17 both have a focal length f, and the lens interval corresponds to 2f as an effective optical path length, thus constituting an optical system in which the diffraction angle becomes equal to the irradiation angle. A laser beam emitted by a laser diode 1 is set to be linearly polarized light along the Z-axis, and is converted into a collimated light beam 3 by a collimator lens 2. The collimated light beam 3 is split into two light beams 5a and 5b at a diffraction angle $\theta$ by a diffraction grating 20 which has a grating alignment direction parallel to the Y-axis, and a grating pitch d.

At this time, as in equation (7), the diffraction angle $\theta$ is given by the following equation:

$$d \sin\theta = \lambda$$

The two light beams 5a and 5b are temporarily converged by the lens 16, and are transmitted through electrooptic crystals 10a and 10b. The light beams diverge again, and are converted into collimated light beams by the lens 17. These light beams are then irradiated onto an object 7 to be measured (in the velocity measurement direction thereof) at the incident angle $\theta$.

If each of the electrooptic crystals 10a and 10b has a thickness d=1 mm and a length l=20 mm, the laser wavelength is set to be $\lambda$=780 nm, the grating pitch d is set to be d=1.6 µm, and the interval between the diffraction grating 20 and the lens 16 is f, the optical axes of the light beams transmitted through the electrooptic crystals 10a and 10b are perpendicular to the incident surfaces of the electrooptic crystals 10a and 10b. The effective length of the electrooptic crystals 10a and 10b through which the optical axes of the light beams 5a and 5b traverse is l=20 mm. At this time, at a position other than the optical axes of the transmitting light beams, the effective length, l", is given by:

$$l'' = l/\cos(\theta'') \quad (12)$$

where $\theta''$ is the angle difference from the optical axis of the light beam inside the electrooptic crystal, and satisfies:

$$\sin(\theta) = N_e \cdot \sin(\theta'') \quad (13)$$

However, the difference between l" and l can be ignored, and the electrooptic crystal satisfactorily serves as a frequency shifter.

When the wavelength varies, the diffraction angle changes according to equation (7), but this apparatus can still remove the wavelength dependence of the Doppler signal as in the above embodiment. Although the incident position of the light beam incident on the electrooptic crystal 10a changes, the angle of the light beam itself remains the same. For this reason, the wavelength dependence can be removed more satisfactorily, and a signal can be detected with high precision.

In this embodiment, the light rays in the light beam have different angle differences from the optical axis, and are incident on the electrooptic crystal 10a at different incident angles. As described above, even when a variation (in this case, a spatial one) in incident angle occurs, the relationship between the change in electric field and the change in refractive index is constant. More specifically, when one of the dispositions shown in FIGS. 8 to 11 is adopted, a constant relationship between the change in refractive index and the electric field strength can be obtained independently of different incident angles of the light rays, and the change in optical phase by constant serrodyne driving can be made constant independently of the incident angles of the light rays. Therefore, no wavefront nonuniformity occurs in the light beam, and the function of the frequency shifter can be satisfactorily obtained. In particular, since the arrangement shown in FIG. 16 adopts the disposition shown in FIG. 8, and the Pockels coefficient as the change coefficient between the refractive index and the electric field strength is maximized in $LiNbO_3$ used in this case, a change in refractive index can be efficiently generated by a low application voltage.

In this embodiment, the interval between the diffraction grating 20 and the lens 16 is set to be f. However, the same effect can be expected if an interval other than f is selected. In this case, since the incident angle of the light beam itself changes upon a change in wavelength, the light rays in the light beam temporally and spatially undergo a change in incident angle. However, with the above-mentioned disposition, the function of the frequency shifter can be satisfactorily obtained without being influenced by these temporal and spatial changes in incident angles.

The particular embodiments of the present invention have been described. As an optical system for irradiating a laser beam onto a moving object so that sin θ/λ becomes almost constant, an arrangement including two diffraction gratings, a combination of two diffraction gratings and a lens, and the like may be adopted within the scope of the invention.

In the embodiments of the present invention, $LiNbO_3$ has been exemplified as an electrooptic crystal (uniaxial crystal). However, the same effect may be provided if ADP or $LiTaO_3$ replaces it.

In the above description, the frequency shifter is applied to the laser Doppler velocimeter, but may be applied to an encoder. In the encoder, a scale (diffraction grating) is disposed on an object to be measured. When the frequency shifter is applied to the encoder, the frequency band of a sensor can be narrowed even in a still state of the scale since the signal output is an AC signal, thus improving the signal S/N ratio. In this manner, the present invention is also effective for the encoder as a value added technique as in the laser Doppler velocimeter.

As described above, according to the above embodiments, a displacement information measurement apparatus, which adopts a simple arrangement using an electrooptic crystal but can attain measurements by applying a periodic voltage to the electrooptic crystal even when an object to be measured moves at a low velocity, and can also attain precise measurements free from the influence of a variation in laser wavelength on the detection result and free from the influence of a temporal or spatial variation in incident angle of light rays upon variation of the laser wavelength, can be realized. In particular, according to the third invention, the apparatus can be realized by a simpler arrangement.

In particular, when all the optic axis, the electric field direction, and the direction of polarization are set to be parallel to each other in $LiNbO_3$, voltage application can be more efficiently performed.

According to the above embodiments, an optical device, which can precisely give a change in optical phase using an electrooptic element in an optical system in which the angles of light rays in a light beam change spatially or temporally, can be realized.

What is claimed is:

1. An optical device comprising:
    an electrooptic crystal on which a light beam is to be incident, said electrooptic crystal being disposed in an optical system in which angles of light rays in the light beam temporally or spatially change; and
    electrodes for applying a predetermined voltage to said electrooptic crystal, said electrodes being disposed substantially so that a voltage application direction thereof is one of parallel to both an optic axis of said electrooptic crystal and a direction of polarization of the light beam incident on said electrooptic crystal, and parallel to one of the optic axis and the direction of polarization and is perpendicular to the other.

2. A device according to claim 1, wherein said electrooptic crystal is applied with a periodic voltage via said electrodes.

3. A device according to claim 1, wherein a laser beam is incident on said electrooptic crystal.

4. A device according to claim 1, wherein said electrooptic crystal consists of $LiNbO_3$.

5. A device according to claim 4, wherein said electrodes are disposed so that the voltage application direction thereof is parallel to both the optic axis of said electrooptic crystal and the direction of polarization of the light beam incident on said electrooptic crystal.

6. A device according to claim 1, wherein said electrodes apply a voltage with a sawtooth waveform.

7. A displacement information measurement apparatus comprising:
    an optical system for forming interference fringes on a region to be measured using two light beams;
    a detection system for receiving light reflected by the region to be measured on which the interference fringes are formed, displacement information of the region to be measured being obtained on the basis of detection by said detection system;
    an electrooptic crystal disposed in said optical system, said electrooptic crystal being disposed in an optical path in which angles of light rays in the light beam temporally or spatially change; and
    a voltage application system for applying a voltage to said electrooptic crystal, said voltage application system being disposed substantially so that a voltage application direction thereof is one of parallel to both an optic axis of said electrooptic crystal and a direction of polarization of the light beam incident on said electrooptic crystal, and parallel to one of the optic axis and the direction of polarization and is perpendicular to the other.

8. An apparatus according to claim 7, wherein said optical system is disposed so that a fringe interval of the interference fringes substantially does not change due to a variation in wavelength of the two light beams.

9. An apparatus according to claim 8, wherein said optical system comprises a diffraction grating for forming the two light beams.

10. An apparatus according to claim 9, wherein said optical system further comprises a parallel mirror system for reflecting light from said diffraction grating.

11. An apparatus according to claim 9, wherein said optical system further comprises a lens system for deflecting light from said diffraction grating.

12. An apparatus according to claim 7, wherein said electrooptic crystal consists of $LiNbO_3$.

13. An apparatus according to claim 12, wherein said voltage application system is disposed so that the voltage application direction thereof is parallel to both the optic axis of said electrooptic crystal and the direction of polarization of the light beam incident on said electrooptic crystal.

14. An apparatus according to claim 7, wherein said optical system comprises a laser light source serving as a light source.

15. An apparatus according to claim 7, wherein velocity information of the region to be measured is obtained on the basis of the detection by said detection system.

16. An apparatus according to claim 7, wherein said voltage application system applies a predetermined periodic voltage to said electrooptic crystal.

17. A displacement information measurement apparatus comprising:
    an optical system for irradiating a light beam onto a region to be measured;
    a detection system for receiving light reflected by the region to be measured irradiated with the light beam, displacement information of the region to be measured being obtained on the basis of detection by said detection system;
    an electrooptic crystal disposed in said optical system, said electrooptic crystal being disposed in an optical path in which angles of light rays in the light beam temporally or spatially change; and a voltage application system for applying a voltage to said electrooptic crystal, said voltage application system being disposed substantially so that a voltage application direction thereof is one of parallel to both an optic axis of said electrooptic crystal and a direction of polarization of the light beam incident on said electrooptic crystal, and parallel to one of the optic axis and the direction of polarization and is perpendicular to the other.

18. An apparatus according to claim 17, wherein an incident angle θ of the light beam on the region to be measured and the wavelength λ of the light beam are set in said optical system, so that sin θ/λ becomes substantially constant with respect to a change in wavelength λ.

19. An apparatus according to claim 18, wherein said optical system comprises a diffraction grating for deflecting the light beam.

20. An apparatus according to claim 19, wherein said optical system further comprises a parallel mirror system for reflecting light from said diffraction grating.

21. An apparatus according to claim 19, wherein said optical system further comprises a lens system for deflecting light from said diffraction grating.

22. An apparatus according to claim 17, wherein said electrooptic crystal consists of $LiNbO_3$.

23. An apparatus according to claim 22, wherein said voltage application system is disposed, so that the voltage application direction thereof is parallel to both the optic axis of said electrooptic crystal and the direction of polarization of the light beam incident on said electrooptic crystal.

24. An apparatus according to claim 17, wherein said optical system comprises a laser light source serving as a light source.

25. An apparatus according to claim 17, wherein velocity information of the region to be measured is obtained on the basis of the detection by said detection system.

26. An apparatus according to claim 17, wherein said voltage application system applies a predetermined periodic voltage to said electrooptic crystal.

27. An apparatus according to claim 17, wherein said optical system is disposed to correct an influence of a wavelength variation of the light beam on a detection result of said detection system.

* * * * *

UNITED STATES PATENT AND TRADEMARK OFFICE
CERTIFICATE OF CORRECTION

PATENT NO. : 5,640,239
DATED : June 17, 1997
INVENTOR(S) : Takamiya et al.

It is certified that error appears in the above-identified patent and that said Letters Patent is hereby corrected as shown below:

COLUMN 1:

Line 64, "10" should be deleted.

COLUMN 6:

Line 62, "ordinary" should read --ordinarily--.

COLUMN 8:

Line 31, "CLK" should read --CLE--, and
             "EP" should read --E|P--;
    Line 49, "CP." should read --C|P.--; and
    Line 67, "C‖EPC" should read --C‖E|P|C--.

Signed and Sealed this

Third Day of February, 1998

Attest:

BRUCE LEHMAN

Attesting Officer        Commissioner of Patents and Trademarks